(12) United States Patent
Park

(10) Patent No.: US 6,341,223 B1
(45) Date of Patent: Jan. 22, 2002

(54) RADIO WAVE PROPAGATION PREDICTION METHOD USING URBAN CANYON MODEL

(75) Inventor: Jee-Yeon Park, Sungnam (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/298,047

(22) Filed: Apr. 22, 1999

(30) Foreign Application Priority Data

Apr. 23, 1998 (KR) .............................................. 98-14497

(51) Int. Cl.$^7$ ................................................. H04Q 7/36
(52) U.S. Cl. ....................... 455/446; 455/67.6; 455/504; 342/359
(58) Field of Search ................................ 455/67.6, 446, 455/504, 506, 10, 449, 422; 342/359, 360; 702/127, 159

(56) References Cited

U.S. PATENT DOCUMENTS

| | | | |
|---|---|---|---|
| 5,450,615 A | 9/1995 | Fortune et al. | ............ 455/67.6 |
| 5,491,644 A | * | 2/1996 | Pickering et al. .......... 455/67.6 |
| 5,623,429 A | 4/1997 | Fortune et al. | ............. 364/578 |
| 5,689,812 A | 11/1997 | Takahashi | .................. 455/67.6 |
| 5,828,960 A | 10/1998 | Tang et al. | ................. 455/446 |

* cited by examiner

*Primary Examiner*—Lee Nguyen
(74) *Attorney, Agent, or Firm*—Dilworth & Barrese, LLP

(57) ABSTRACT

A method for predicting the characteristics of wave propagation in an urban canyon model considering the effect of polarization is disclosed. The method comprises the steps of: numbering a plurality of image antennas corresponding to reflections between transmitting and receiving antennas in an urban canyon; determining the propagation paths corresponding to the respective image antennas; computing the respective first reflection points of the propagation paths corresponding to the image antennas; computing the respective reflection electric field vectors of the propagation paths corresponding to the image antennas; and finding the total received power of the receiving antennas through the reflection electric field vectors of the propagation paths and the unit polarization vector of the receiving antenna. Accurate fading effects can be obtained by assuming a sufficiently large number of propagation pathways. The distribution of the receiving power can be obtained for a varying polarization of the receiving antenna.

12 Claims, 11 Drawing Sheets

FIG. 8    $m = 0$ (DIRECT WAVE ONLY)
         $x_n = 20m$
         $x_t = 5m$

RADIO WAVE PROPAGATION PREDICTION METHOD USING URBAN CANYON MODEL

BACKGROUND

1. Field of the Invention

The present invention relates generally to a radio wave prediction technique using an urban canyon model. The invention is particularly useful in wireless communication system design. 2. Description of the Related Art In a digital microcellular communication system, repeater antennas are distributed throughout a geographical coverage area, particularly an urban area, to communicate directly with wireless communication devices. The repeater antennas are typically hard wired to a main base station (BTS) serving a cell through copper cables, optic cables, or optic waveguides. An important consideration in the design of a microcellular system is where to place these antennas to prevent the occurrence of dead zones where insufficient signal strength is present. A dead zone may be caused by multiple reflections off buildings, etc., that converge at a specific location to cause the signal the fade in and out.

Empirical approaches may be used to optimize the placement of the repeater antennas to minimize performance degradation caused by multiple reflections. However, these approaches are both costly and time-consuming. As such, it is desirable to employ a method for modeling and predicting radio frequency (RF) propagation in the urban environment to arrive at suitable antenna locations. One such model is referred to as an urban canyon model, which defines a canyon formed in the space between a pair of buildings and the ground. The buildings and the ground are all assumed to be lossy dielectrics. A transmitting antenna and receiving antenna are assumed to be standing perpendicular to the ground surface. The RF energy transmitted produces a multiplicity of reflection waves off the buildings and ground. If the propagation pathways of the radio wave from the transmitting antenna to the receiving antenna are known, the reflection coefficients at the respective reflection points may be obtained. A number representing how many times the reflections have occurred in the propagation pathways of the respective reflection waves can also be found. For this purpose, an image technique is employed.

FIG. 1 illustrates the environment of the prior art urban canyon model. As illustrated, a straight road including a ground 3, a building #1 1, and a building #2 2 are modeled as forming a dielectric canyon 10. Permittivities ($\epsilon_1$, $\epsilon_2$, $\epsilon_g$) and permeabilities ($\mu_1$, $\mu_2$, $\mu_g$) are assigned for the respective media of building #1, building #2, and the ground as indicated in FIG. 1. Within the canyon is a transmitting antenna 4 with three dimensional coordinates ($x_t$, $y_t$, $z_t$) and a receiving antenna 5 with coordinates ($x_r$, $y_r$, $z_r$). The radio waves (i.e., rays) emanating from transmitting antenna 4 are assumed to be radiated in all directions. One of the radio waves is a direct wave reaching the receiving antenna directly without any reflection. Other radio waves are multiple reflection waves reaching the receiving antenna by reflecting off one or more wall surfaces of the two buildings 1,2 and the ground surface 3. The image technique is adopted to find the exact points on the wall surfaces and/or the ground at which the multiple reflection waves are reflected.

It is assumed in FIG. 1 that the surfaces of the two buildings are infinite in the y and z directions, and the ground is infinite in the y direction. This assumption is allowable because the sizes of the respective reflection surfaces are much larger than the wavelengths of the transmitted radio waves. On account of this, image antennas are assumed to be infinitely generated upon the two surfaces of the buildings 1, 2. Other image antennas are generated beneath the ground. Each image antenna, whether above or below the ground, is intended to correspond to a reflection off one of the buildings or off the ground surface; the location of each image antenna depends on the location and direction of its corresponding reflection ray. Once all image antennas are defined, the received power at the receiving antenna 5 can be computed using a free space model that sums the RF energy contributions from the various image antennas. An equation defining the received power caused by the direct waves received at the receiving antenna 5 and the multiple reflection waves, is:

$$P_r = P_t \left(\frac{\lambda}{4\pi}\right)^2 \left| \sum_{n=0}^{\infty} G_n R_n \frac{e^{jkr_n}}{r_n} \right|^2 \quad \text{EQ. 1}$$

where, $P_t$ is the transmitting power, $\lambda$ is the wavelength of the radio wave, k is the wave number (2 $\pi/\lambda$), n is the number of propagation pathways, $G_n$ is the square root of the gain product of the transmitting and receiving antennas in the $n^{th}$ propagation pathway, $R_n$ is a pathway reflection coefficient, and $r_n$ is the distance of the propagation pathway between the transmitting antenna 4 and the $n^{th}$ receiving image antenna. If n=0, then this indicates the direct wave; all other values of n indicate reflection waves. Considering the directivities and beamwidths of the transmitting and receiving antennas, the value of $G_n$ may be varied depending on the relative locations of the transmitting and receiving antennas. The parameter $R_n$ represents the product of the reflection coefficients of the waves reflected on the surfaces of buildings 1,2 and/or ground 3, multiplied by the reflection counts. EQ. 1 assumes that the radio waves are all vertically polarized ($\theta$-direction). Only the radiation field strength, and not the polarization effect, is taken into account.

FIGS. 2A and 2B illustrate a prior art procedure of generating and numbering the image antennas. FIG. 2A illustrates the generation of the image antennas and x-coordinates, and FIG. 2B illustrates the numbering of the image antennas.

The following is an explanation of a prior art algorithm which finds the propagation pathways of the direct waves and the multiple reflection waves existing in the canyon model.

Referring still to FIG. 1, image antennas corresponding to the reflection waves off the wall surfaces are generated because of the two dielectric surfaces, that is, the wall surfaces of the buildings. Image antennas beneath the ground surface correspond to reflection waves that include a reflection off the ground surface. $R_{nv}$ indicates the image receiving antennas generated due to reflection off the surfaces of the two buildings 1, 2 and the ground surface 3, where n is the number of a particular image antenna, and v is a number representing whether that image antenna is above or below the ground surface. For an image antenna above the ground surface, the number v is assigned "0", and for an image antenna beneath the ground surface, v is assigned "1". Therefore, the $n^{th}$ image receiving antenna above the ground surface is designated as $R_{no}$ and the $n^{th}$ image receiving antenna beneath the ground surface is designated as $R_{n1}$.

The indefinite image antennas generated by the surfaces of the two buildings are numbered as follows:

Actual receiving antenna 5 is assigned n=0, thereby being denoted by $R_{00}$. Image antennas generated by the reflections from the walls of both buildings are numbered as follows: those residing in the x<0 area are assigned odd numbers, and those residing in the x>0 area are assigned even numbers, in sequence. FIG. 2A shows the numbered antennas, and the numbering rule is illustrated by the square wave of FIG. 2B. For each propagation pathway to be considered, the transmitting antenna is assumed to generate two image antennas $R_{10}$ and $R_{20}$. Images $R_{10}$ and $R_{20}$ correspond to reflections off the left and right building surfaces, respectively. Image antennas generated from $R_{10}$ are denoted with the numbers in the lower part of the square wave, and image antennas generated from $R_{20}$ are denoted with the numbers in the upper part of the square wave. Thus, image $R_{10}$ (i.e., $R_1$ in FIG. 2A or "1" in FIG. 2B) produces a ray that reflects off the right building to generate image $R_{40}$ (i.e., $R_4$ in FIG. 2A or "4" in FIG. 2B). Image $R_{40}$ then produces image $R_{50}$, and so forth, until the RF energy reaches the receiving antenna through continued multiple reflections. Likewise, image $R_{20}$ produces images $R_{30}$, $R_{60}$, etc. It is noted here that the term "propagation pathway", as used herein, means any path in which RF energy from the transmitting antenna can reach the receiving antenna, whether or not reflections occur. Thus, for instance, the direct path from the transmitting antenna to the receiving antenna defines one propagation pathway; another propagation pathway is the path in which RF energy from transmitting antenna 5 reflects off a single surface and then reaches the receiving antenna 4; yet another pathway includes a reflection off only two surfaces to reach receiving antenna 4; and so forth.

When computing the receiving power using EQ. 1, RF energy is assumed to emanate from the respective image antennas and arrive at the receiving antenna 5. The total counts of the reflections generated because of buildings 1 and 2 must be known. The odd image antennas $R_{10}$, $R_{30}$, $R_{50}$, $R_{70}$, etc. represent rays that start from the transmitting antenna 4, and are first reflected off building #1, pass respective remaining pathways, and then arrive at the receiving antenna 5.

On the contrary, for even n, the image antennas $R_{20}$, $R_{40}$, $R_{60}$, $R_{80}$, etc. represent rays that start from the transmitting antenna 4, and are first reflected off building #2, pass respective remaining pathways, and then arrive at the receiving antenna 5. In the square wave diagram of FIG. 2B, the vertically aligned antenna numbers, that is, {0}, {1,2}, {3,4}, {5,6}, etc. have common reflection counts $m_n$=0, 1, 2, 3, etc., in sequence. For example, image antennas 1 and 2 each have a reflection count of 1; image antennas 3 and 4 each have a reflection count of 2; and so forth. The general equation for the reflection count of the $n^{th}$ image antenna is:

$$m_n = \frac{(2n+1)+(-1)^{n+1}}{4} \qquad \text{EQ. 2}$$

where, n=0, 1, 2, 3, etc.

The reflection process of the image antennas beneath the ground surface is identical to the case of the image antennas on the ground surface, and includes one more ground surface reflections.

From EQ. 1 and EQ. 2, the coordinates $(x_n, y_n, z_n)$ of the $(n, v)^{th}$ image receiving antenna $R_{nv}$ are:

$$x_n = (-1)^{m_n} x_r + \left\{(-1)^n m_n + \frac{1+(-1)^{m_n+1}}{2}\right\} w \qquad \text{EQ. 3}$$

$$y_n = y_r$$

$$z_v = (-1)^v z_r$$

where, $m_n$ is defined by EQ. 2, $y_r$ and $Z_r$ are the respective y and z coordinates of receiving antenna 5 and W is the width of the road between the two buildings. Also, to determine how many image antennas are generated for each propagation pathway, it is necessary to determine the number of reflections that occur between the two buildings. By generating image antennas corresponding to the respective multiple reflection waves, the entire space is replaced with free space without obstacles. As such, the receiving power equation used in free space may be employed.

This numbering method is meritorious in that it facilitates finding the indefinite multiple propagation pathways. Because of the long distance between the transmitting and receiving antennas, it is assumed that only the vertical component of the electric field exists. Therefore, when reflection occurs in the canyon model, the waves reflected off the building are assumed to be vertically polarized whereas the waves reflecting off the ground are assumed to be horizontally polarized, and the gain of the transmitting antenna and the receiving antenna is, assuming a dipole antenna, fixed as 1.64 dBi.

In the actual urban environment, however, although the transmitting antenna is fixed vertical to the ground surface, the polarization direction of the receiving antenna may be freely varied by the user. That is, in the canyon model, not only the vertical component to the ground surface, but also the horizontal component, though it is weak, exist, and this horizontal component affects the receiving power. But, in the prior art, because the electric field is regarded as a scalar component, the receiving power affected by the variation of the polarization direction of the antenna cannot be found.

Another prior art method for predicting RF propagation, which finds multiple propagation pathways by considering reflections that are generated within the propagation pathways in a building, is disclosed in U.S. Pat. No. 5,450,615 entitled "Prediction of Indoor Electromagnetic Wave Propagation for Wireless Indoor Systems". In this patent, an imaging method is used to predict RF propagation within a structure. Each reflective surface is associated with a reflection and transmission coefficient. Reference transmitter and receiver locations are assumed, with a reflection path traced backwards from each receiver location to the reflective surfaces to generate images. While this technique may be useful for predicting indoor propagation, its utility for predicting urban environment outdoor propagation in a computationally efficient manner is questionable.

SUMMARY OF THE INVENTION

It is an object of the present invention to provide a method for predicting the characteristics of wave propagation by considering the electric field as not a scalar component but a vector component so as to be applied to actual urban conditions and finding the unit vector of the direction to which the radio waves start from the transmitting antenna.

It is another object of the present invention to provide a method for computing the receiving power considering the directivity and the polarization of the transmitting antenna and the receiving antenna within an urban model.

It is another object of the present invention to provide a method for finding the coordinates of the first reflection point in order to find the propagation pathways corresponding to the respective image antennas.

It is another object of the present invention to provide a method for considering the polarization of the receiving antenna by obtaining the product between the polarization vector of the receiving antennas and the radio wave reaching the receiving antenna.

In an illustrative embodiment of the invention, a method for predicting the characteristics of wave propagation in an urban canyon model considering the effect of polarization includes the steps of: numbering a plurality of image antennas corresponding to reflections between transmitting and receiving antennas in an urban canyon; determining the propagation paths corresponding to the respective image antennas; computing the respective first reflection points of the propagation paths corresponding to the image antennas; computing the respective reflection electric field vectors of the propagation paths corresponding to the image antennas; and finding the total received power of the receiving antennas through the reflection electric field vectors of the propagation paths and the unit polarization vector of the receiving antenna. Advantageously, accurate fading effects can be obtained by assuming a sufficiently large number of propagation pathways. In addition, the distribution of the receiving power can be obtained for a varying polarization of the receiving antenna.

DETAILED DESCRIPTION OF THE PREFERRED EMBODIMENTS

In an illustrative embodiment of the present invention to be described in detail below, an urban canyon model employing image antennas is used to predict propagation characteristics in an urban environment. The model considers the effects of polarization, and in particular, the polarization orientation of the receiving antenna is allowed to vary. The electric field components for considering the polarization direction of the radio waves are vector, and the dyadic reflection coefficient is utilized. The propagation pattern within the canyon model is three dimensional, considering the polarization direction of the antennas.

In order to consider the electric field as not scalar but vector, the unit vector directing the propagation direction will be found, and this propagation direction is the direction to which the waves starting from the transmitting antenna are proceeding. Therefore, the location coordinates of the first reflection point will be found. The vertical component and horizontal component in the electric field are divided into respective unit vector components using rectangular coordinates. The gain of the transmitting antenna may be found by transforming the rectangular coordinates into spherical coordinates.

The waves propagated from the transmitting antenna are reflected at reflection points corresponding to respective image antennas. By utilizing the dyadic reflection coefficient, the reflection electric field is described as a vector. Finally, by obtaining the composite of the waves arriving at the receiving antenna and considering the polarization of the receiving antenna, the receiving power can be found.

Figure 3:
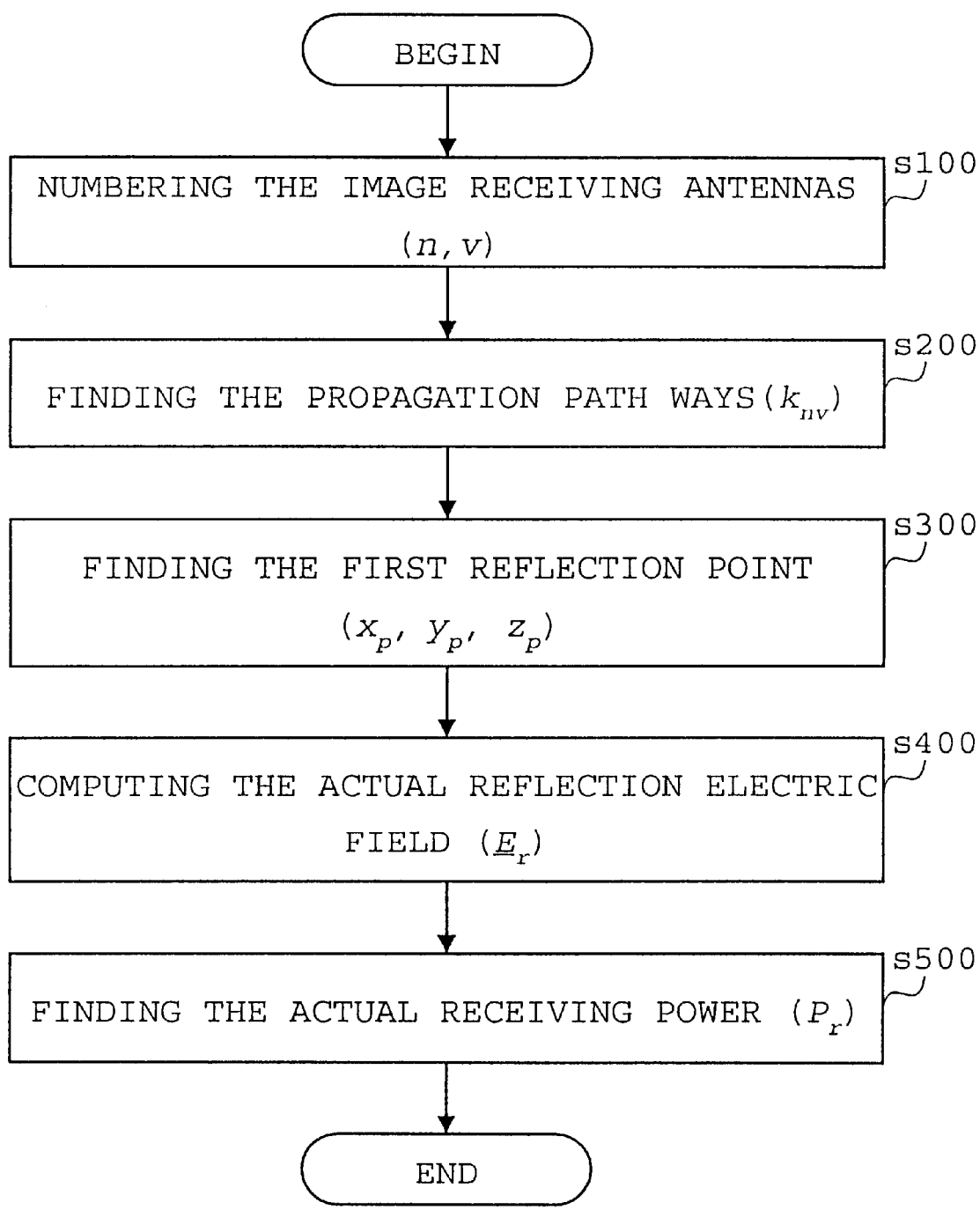
FIG. 3 is a flow chart for predicting the characteristics of wave propagation according to the present invention.

FIG. 3 is a flow chart illustrating a method for predicting the characteristics of wave propagation according to the present invention. The method is implemented by means of a computer program running on a general or special purpose computer. In step S100, a plurality of image receiving antennas such as (n,v) in the urban canyon model are numbered. Next, the routine finds the propagation paths and the reflection counts $k_{nv}$ corresponding to the respective numbered image receiving antennas (step S200). The respective first reflection points $(x_p, y_p, z_p)$ of the propagation paths corresponding to the image receiving antennas are then found (step S300). The respective actual reflection electric fields $E_r$ (i.e., electric field caused by a reflective ED ray) of the propagation paths corresponding to the image receiving antennas are then computed (step S400). Finally, the routine finds the total received power $P_r$ of the receiving antennas through the actual reflection electric field vector $E_{nv}$ of the propagation paths and the unit polarization vector $h_r$ of the actual receiving antenna corresponding to the image receiving antennas (step S500).

Figure 4:
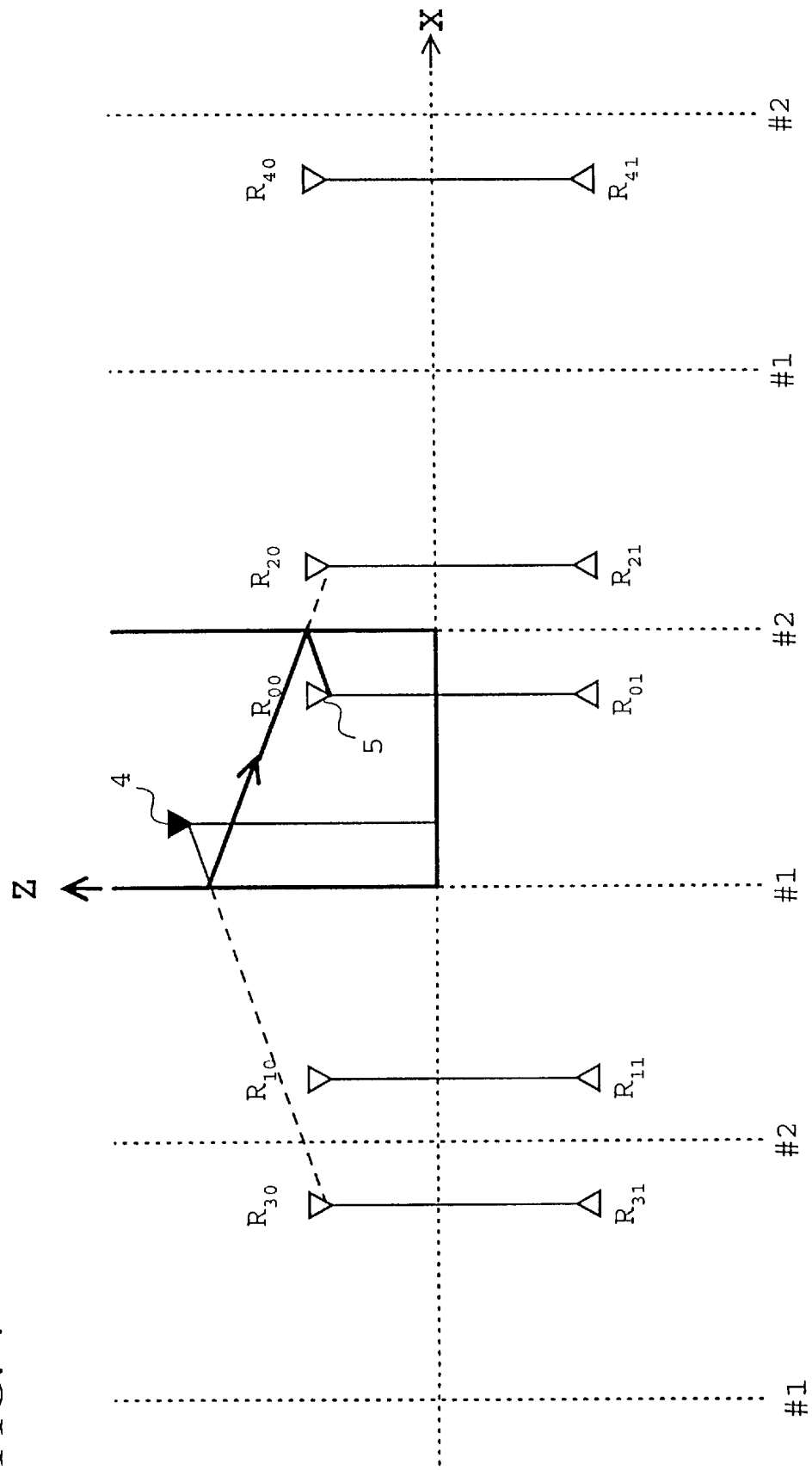
FIG. 4 is a schematic diagram showing the propagation pathways of image antennas on the ground surface.
Figure 5:
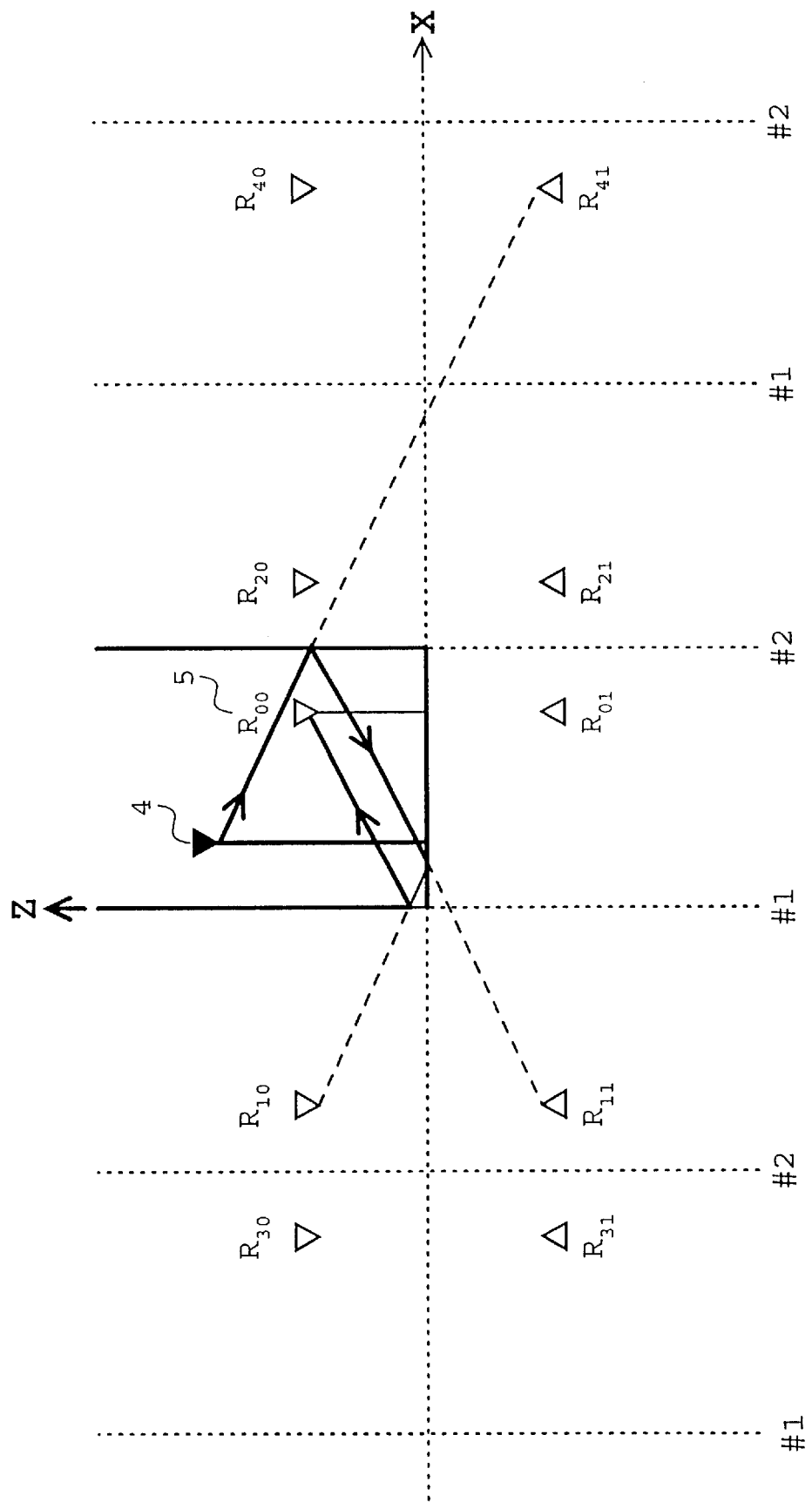
FIG. 5 illustrates a schematic diagram showing propagation pathways of image antennas beneath the ground surface.

When the actual waves are reflected off the surfaces of the two buildings and the ground surface, the order of the reflections and the corresponding reflection points can be found by determining location information of the image receiving antennas using a known technique. The propagation pathways of the image antennas in the view of the xz plane is shown in FIGS. 4 and 5. The propagation pathway from the transmitting antenna to any given image receiving antenna $R_{nv}$ satisfies the following equation:

$$\frac{x - x_t}{x_n - x_t} = \frac{y - y_t}{y_n - y_t} = \frac{z - z_t}{z_v - z_t} \qquad \text{EQ. 4}$$

where, the coordinates of the transmitting antenna 4 are $(x_t, y_t, z_t)$, the coordinates of the image receiving antenna $R_{nv}$ are $(x_n, y_n, z_v)$, and $(x, y, z)$ are the coordinates of any point on the propagation pathway.

FIG. 4 is a schematic diagram showing the propagation pathways of the image antenna $R_{30}$ on the ground surface, which corresponds to the case of v=0, representing reflections off the building surfaces. The number of reflection counts off the building surfaces, for the nth image antenna, is designated as $m_n$. That is, there are a total of $m_n$ reflections off the building surfaces for image $R_{nv}$.

Specifically, for the case n=0, that is, $0<x_n<w$, the waves reach the receiving antenna directly without reflection. For even n, that is $x_n>w$, the waves are reflected off the surface of building #2 and then reflected off the surface of building #1, eventually reaching the receiving antenna. For odd n, that is, $x_n<0$, the rays are reflected off the surface of building #1 and then reflected off the surface of building #2, eventually reaching the receiving antenna.

FIG. 5 is a schematic diagram showing the propagation pathways of the image antenna $R_{41}$, beneath the ground surface, i.e., for v=1, reflected off the ground surface one time, and the total reflection counts are $m_n+1$ including the reflections off the surface of the building. To understand the reflection procedure at this time, the ground reflection points need to be determined.

Assuming the reflection counts off the surfaces of the building prior to ground surface reflection are denoted $k_{nv}$, the rays are reflected off the building surfaces in the same way as the v=0 case, up to $k_{nv}$ counts. After that, reflections off the ground surface occur and the remaining reflections off the building surfaces occur $m_n - k_{nv}$ times.

The process for finding $k_{nv}$ will now be described. Referring to FIG. 4, because the image antennas above the ground surface, that is, the image antennas for the case of v=0, do not represent reflections off the ground surface, $k_{nv}$ is not considered. Therefore, $k_{nv}$ needs to be found only for the case of v=1. Specifically, when n=0 (direct wave), $k_{nv}$=0.

The reflection counts for n≠0 are found as follows: in FIG. 4, the reflections off the building surface occur on the surface of the building corresponding to the coordinates (x,z) which satisfy EQ. 5:

$$x = iw \qquad \text{EQ. 5}$$
$$z = z_t + \frac{z_v - z_t}{x_n - x_t}(x - x_t)$$

where, for even n, I=1,2,3, ..., $m_n$, and, for odd n, I=0, −1, −2, ..., (1−$m_n$).

Therefore, the total reflection counts $k_{nv}$ off the building surfaces just prior to the ground surface reflection is:

$$k_{nv} = (-1)^n i - \frac{1 + (-1)^n}{2}, \qquad \text{EQ. 6}$$

where I is an integer between (1−$m_n$) and $m_n$ which satisfies the condition, in EQ. 5, of z being a maximum among the possible values of z for z<0; and n is the number of the image antenna behind the surface of the building.

Whether or not a ray propagating from the transmitting antenna will be reflected off the ground surface or the building surfaces may be known from EQ. 6. Further, the coordinates of the first reflection point of a pathway in which a plurality of reflections occur may be known from EQ. 6. And the unit vector having the same direction of the ray propagating from the transmitting antenna, may be found from knowledge of the first reflection point. The coordinates P of the reflection point where the ray starting from the transmitting antenna is first reflected are denoted hereafter as ($x_p$, $y_p$, $z_p$). Of course, if there is no reflection, that is, n=0, v=0, the ray is directly transmitted from the transmitting antenna to the receiving antenna, and no reflection point exists.

If the first reflection occurs on the surface of the building, that is, n≠0 and v=0, or, n≠0, v=1, and $k_{nv}$<1, the coordinates of the first reflection point are defined by EQ. 7 (which follows from EQ. 4):

$$x_p = \frac{1 + (-1)^n}{2} w \qquad \text{EQ. 7}$$
$$y_p = y_t + \frac{y_n - y_t}{x_n - x_t}(x_p - x_t)$$
$$z_p = z_t + \frac{z_v - z_t}{x_n - x_t}(x_p - x_t).$$

On the other hand, if the first reflection occurs on the ground surface, that is, n=0, v=1, or, n≠0, v=1, and $k_{nv}$=0, the coordinates of the first reflection point are defined by EQ. 8 (which also follows from EQ. 4):

$$x_p = x_t + \frac{x_n - x_t}{z_v - z_t}(z_p - z_t), \qquad \text{EQ. 8}$$
$$y_p = y_t + \frac{y_n - y_t}{z_v - z_t}(z_p - z_t),$$
$$z_p = 0.$$

From the first reflection point coordinates and the coordinates of the transmitting antenna, the unit vector ŝ', whose direction points from the transmitting antenna, is defined by EQ. 9:

$$\hat{s}' = \frac{1}{d}[\hat{x}(x_p - x_t) + \hat{y}(y_p - y_t) + \hat{z}(z_p - z_t)], \qquad \text{EQ. 9}$$

where, d is the distance between the transmitting point and the first reflection point. This distance is computed as:

$$d = \sqrt{(x_p - x_t)^2 + (z_p - x_t)^2 + (z_p - z_t)^2}. \qquad \text{EQ. 10}$$

Following the above procedure, the characteristics (e.g., direction, signal strength, polarization) of the first reflected ray can be derived from the first reflection point ($x_p$, $y_p$, $z_p$) of EQ. 7 or EQ. 8, the unit vector ŝ' of EQ. 9, and the characteristics of the reflective surface media. This reflected ray becomes the next incident ray to be reflected in the canyon model. The final reflected ray reaching the receiving antenna may be found from knowledge of the propagation pathway of the ray from the transmitting to the receiving antenna The process is then repeated for many rays, each having a different first reflection point which results in a unique propagation pathway. Aside from the propagation pathway of the direct path from the transmitting to receiving antenna, each propagation pathway includes one or more reflections. For instance, for a propagation pathway having only a single reflection, the RF energy reflected from the first reflection point reaches the receiving antenna directly. For this case, only a single image antenna will be generated to model the propagation. Other propagation pathways include multiple reflections—these pathways are modeled with multiple image antennas. To arrive at the receive power at a specific receiver location, the composite RF energy of many propagation pathways is computed.

Next, the procedure to find the reflected electric field of these reflected rays will be explained. The reflected electric field $E_r$ of the incident electric field $E_i$ is given in EQ. 11:

$$\underline{E}_r = \underline{E}_i \cdot \overline{\overline{\Gamma}} \frac{\rho}{\rho + s} e^{-jks}, \qquad \text{EQ. 11}$$

where, ρ: the radius of curvature of the reflected wave front at the reflection point, s: the distance from the reflection point to the field point, k: the wave number, and Γ: dyadic reflection coefficient, defined in EQ. 12:

$$\overline{\overline{\Gamma}} = \hat{e}'_\perp \hat{e}_\perp \Gamma_\perp + \hat{e}'_\| \hat{e}_\| \Gamma_\|, \qquad \text{EQ. 12}$$

$$\Gamma_\perp = \frac{\cos\alpha - \sqrt{\varepsilon_r - \sin^2\alpha}}{\cos\alpha + \sqrt{\varepsilon_r - \sin^2\alpha}},$$

$$\Gamma_\| = \frac{\varepsilon_r \cos\alpha - \sqrt{\varepsilon_r - \sin^2\alpha}}{\varepsilon_r \cos\alpha + \sqrt{\varepsilon_r - \sin^2\alpha}},$$

where, ê'$_\perp$: the unit vector of the perpendicular polarization before the reflection, ê$_\perp$: the unit vector of the perpendicular polarization after the reflection, ê'$_\|$: the unit vector of the parallel polarization before the reflection, ê$_\|$: the unit vector of the parallel polarization after the reflection, Γ$_\perp$ and Γ$_\|$ are the reflection coefficients for perpendicular polarization and parallel polarization, respectively, which are functions of the angle of incidence and the permittivity. The permeability of the media is set as $\mu_0$, the permeability of free space. The angle of incidence is given in EQ. 13:

$$\alpha = \cos^{-1}(-\hat{n}\cdot\hat{s}),\qquad\text{EQ. 13}$$

where, $\hat{n}$: the normal vector of the reflective surface, and $\hat{s}$: the unit vector of the incident wave.

The permittivity $\epsilon_r$ of the reflective media is given in EQ. 14: EQ. 14

$$\varepsilon_r = \varepsilon'_r - j\frac{\sigma}{\varpi\varepsilon_0},\qquad\text{EQ. 14}$$

where, $\epsilon'_r$: relative permittivity, complex number; $\sigma$[S/m]: conductivity; $\bar{\omega}$: angular frequency; and $\epsilon_0$: the permittivity of the free space.

By way of example, Table 1 lists $\epsilon_r$, $\epsilon'_r$, and $\sigma$ of both the building and the road, when the frequency is 1.8 GHz.

TABLE 1

|  | Relative Permittivity, $\epsilon'_r$ | Conductivity, $\sigma$ [S/m] | Complex Permittivity, $\epsilon_r$ |
| --- | --- | --- | --- |
| Building | 3 | 0.005 | 3-j0.0499 |
| Road (Ground) | 15 | 7 | 15-j69.9046 |

By following the above procedure, the canyon model is replaced with a free space model comprising a multiplicity of image antennas, and the actual reflection electric field in the propagation pathways corresponding to respective image receiving antennas can be found. Moreover, the reflection electric field at the respective reflection points and the final receiving electric field can be found from the first incident electric field. By substituting the above values in the receiving power equation of the free space model, the receiving power $P_r$ of the actual receiving antenna is computed. The variable $\hat{h}_r$, which is the unit polarization vector of the receiving antenna, is used to consider the polarization direction of the receiving antenna in the receiving power equation.

In the actual urban environment, the polarization of the receiving antenna may be varied relative to the fixed transmitting antenna. Therefore, considering the directivity and polarization of the transmitting and receiving antennas in the canyon model, when the waves leaving the transmitting antenna reach the receiving antenna through the indefinite multiple propagation pathways, the receiving power $P_r$ is determined as:

$$P_r = \frac{\lambda^2}{4\pi\eta}\left(\sum_{v=0}^{1}\sum_{n=0}^{N}\sqrt{G_{nv}}E_{nv}\cdot\hat{h}_r\right)^2,\qquad\text{EQ. 15}$$

where, $\lambda$: the wavelength of the radio wave, $\eta$: the wave impedance of free space, $G_{nv}$: gain of the receiving antenna, $E_{nv}$: the electric field vector reaching the receiving antenna, $\hat{h}_r$: the unit polarization vector of the receiving antenna (in rectangular coordinates), n: the number of an image antenna corresponding to a specific reflection point on the ground or a building surface in the canyon, v=0 indicates image antennas above the ground, and v=1 indicates image antennas beneath the ground. The total number of image antennas associated with surface reflections is theoretically infinite, but in order to perform a practical computation, it is set as N, a definite number. In this case, the total number of propagation pathways is $N_T=2(N+1)$. In EQ. 15, it is assumed that the polarization of all the radio waves is $\theta$ directional (vertically polarized) and only radiation fields of antennas is considered. A similar equation can be generated for a horizontally polarized transmitting antenna.

An example to illustrate simulation results of a typical model in accordance with the invention will now be presented in reference to FIGS. 6–11. The receiving power is computed using the above-noted determination of the reflection points and the multiple propagation pathways. The conditions to compute the receiving power of EQ. 15 are as follows: assuming that both the transmitting and receiving antennas are dipoles, the gain G is given as the $\theta$ function in the spherical coordinates as:

$$G(\theta) = 1.64\left(\frac{\cos(\frac{\pi}{2}\cos\theta)}{\sin\theta}\right)^2.\qquad\text{EQ. 16}$$

Figure 1:
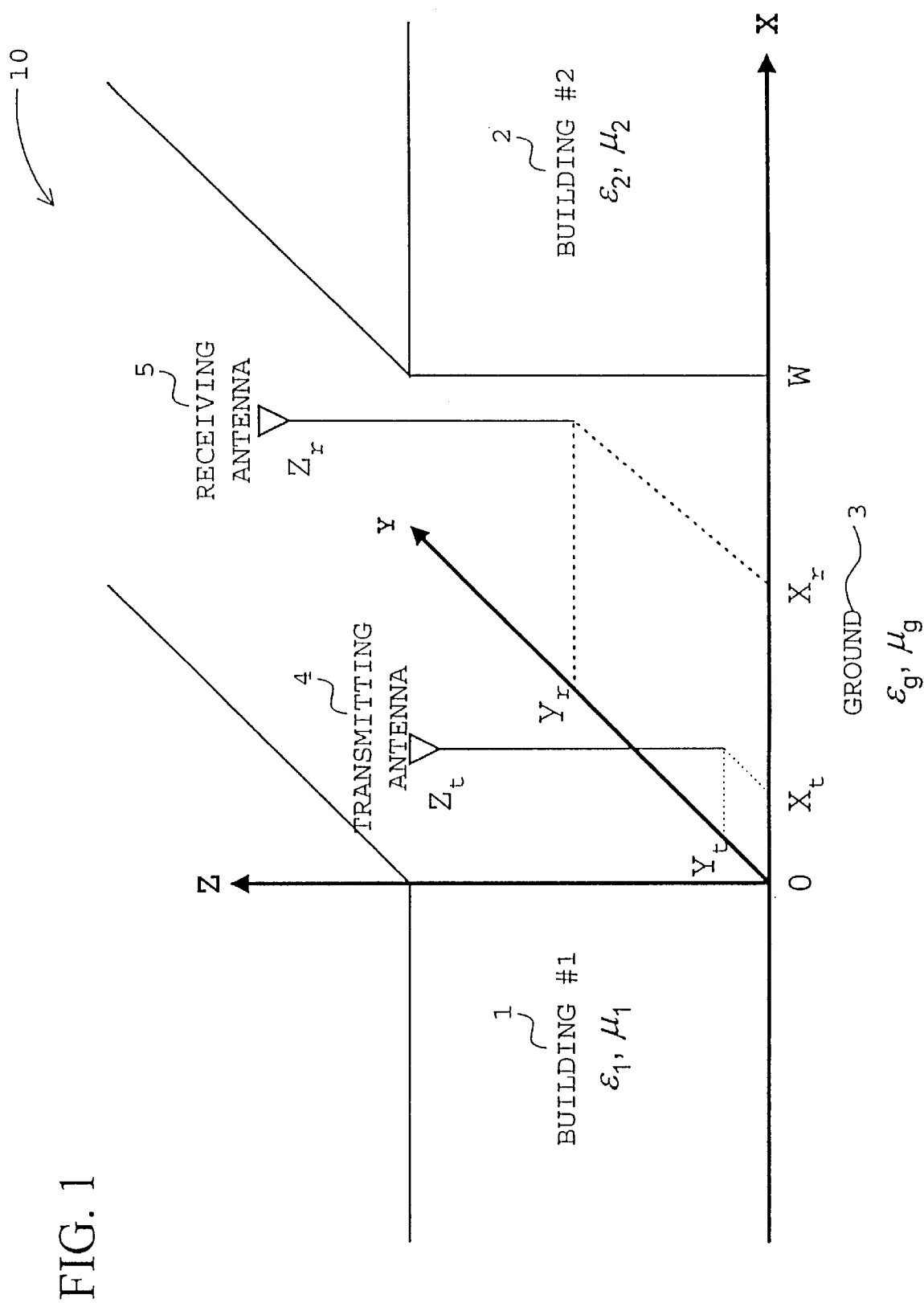
FIG. 1 illustrates the concept of a prior art urban canyon model for predicting RF propagation.
Figure 2A:
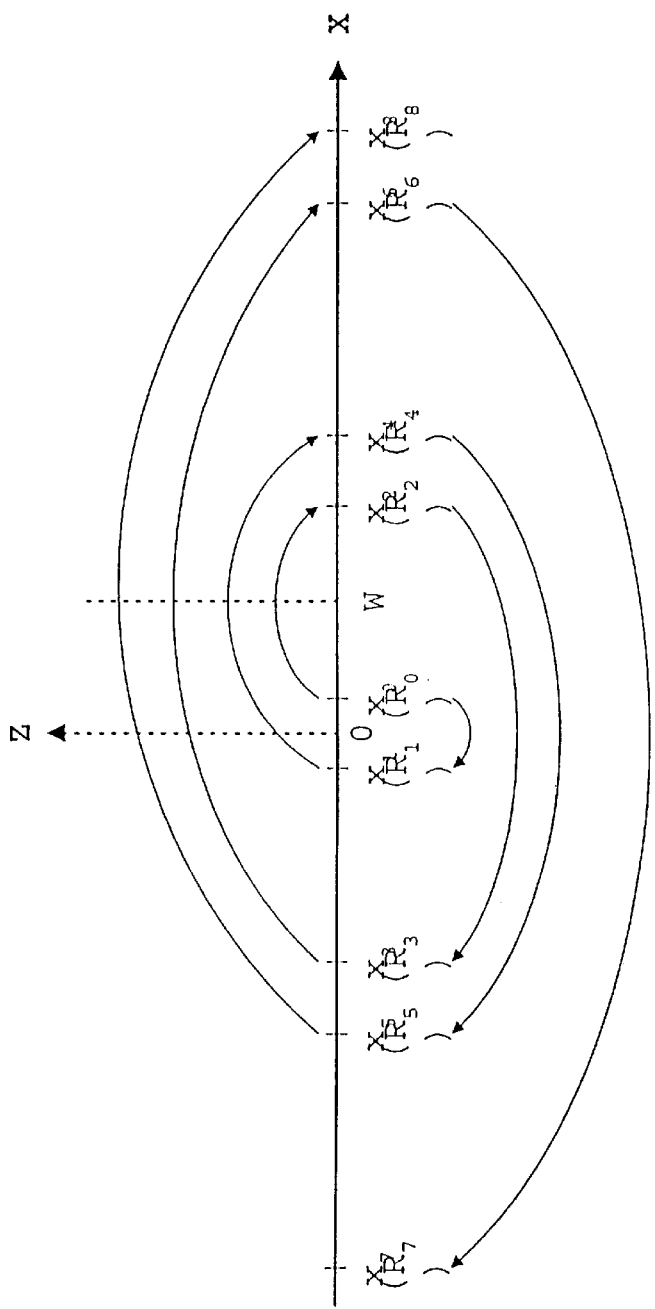
FIGS. 2A and 2B illustrate a prior art procedure of generating and numbering the image antennas.
Figure 2B:
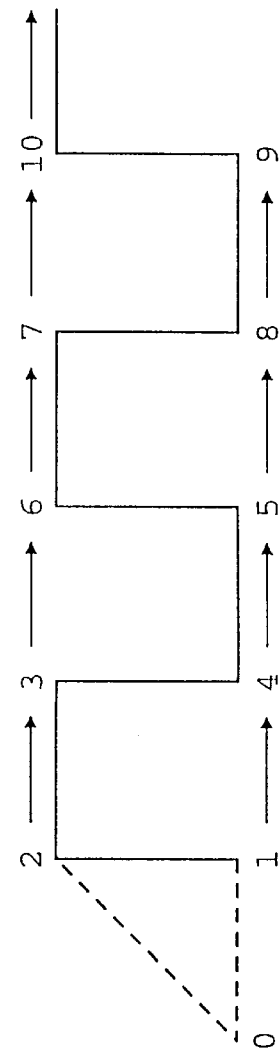

The polarization vector is a function of $\hat{\theta}$. The other assumed conditions are as follows: the transmitting antenna is assumed to stand vertical to the ground (vertically polarized), and the transmitting power $P_t$ is 10 mW. The receiving antenna 5 is situated in the urban canyon as shown in FIG. 1, oriented in the xz plane, and its polarization is assumed to be variable. The angle between the x axis and the receiving antenna 5 is denoted by $\gamma$. The width W of the road in the canyon model is set to 25 m. The location of the transmitting antenna is: $x_t=5$ m, $y_t=0$ m, height $z_t$ is 9 m. The location of the receiving antenna is: $x_r=20$ m (unless otherwise indicated); height $z_r=1.5$ m, and $y_r$ is variable. The complex permittivity $\epsilon_r$ follows that of Table 1, and the frequency is 1.8 GHz. The above-noted conditions are applied to EQ. 15 in order to find the distribution of the receiving power.

Figure 6:
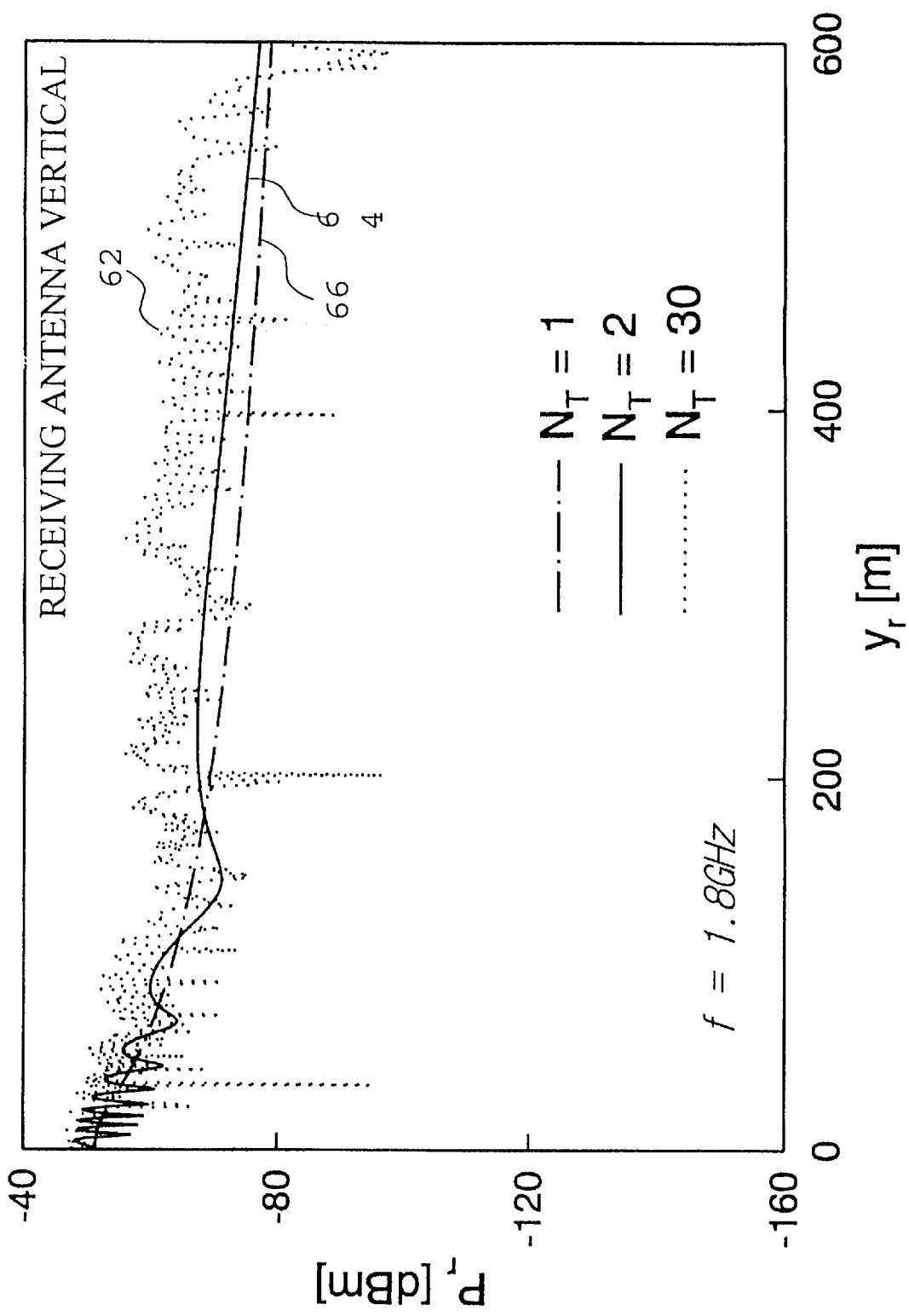
FIG. 6 illustrates an exemplary distribution of receiving power according to the number of the paths, for receiving antennas oriented perpendicular to the ground surface.
Figure 7:
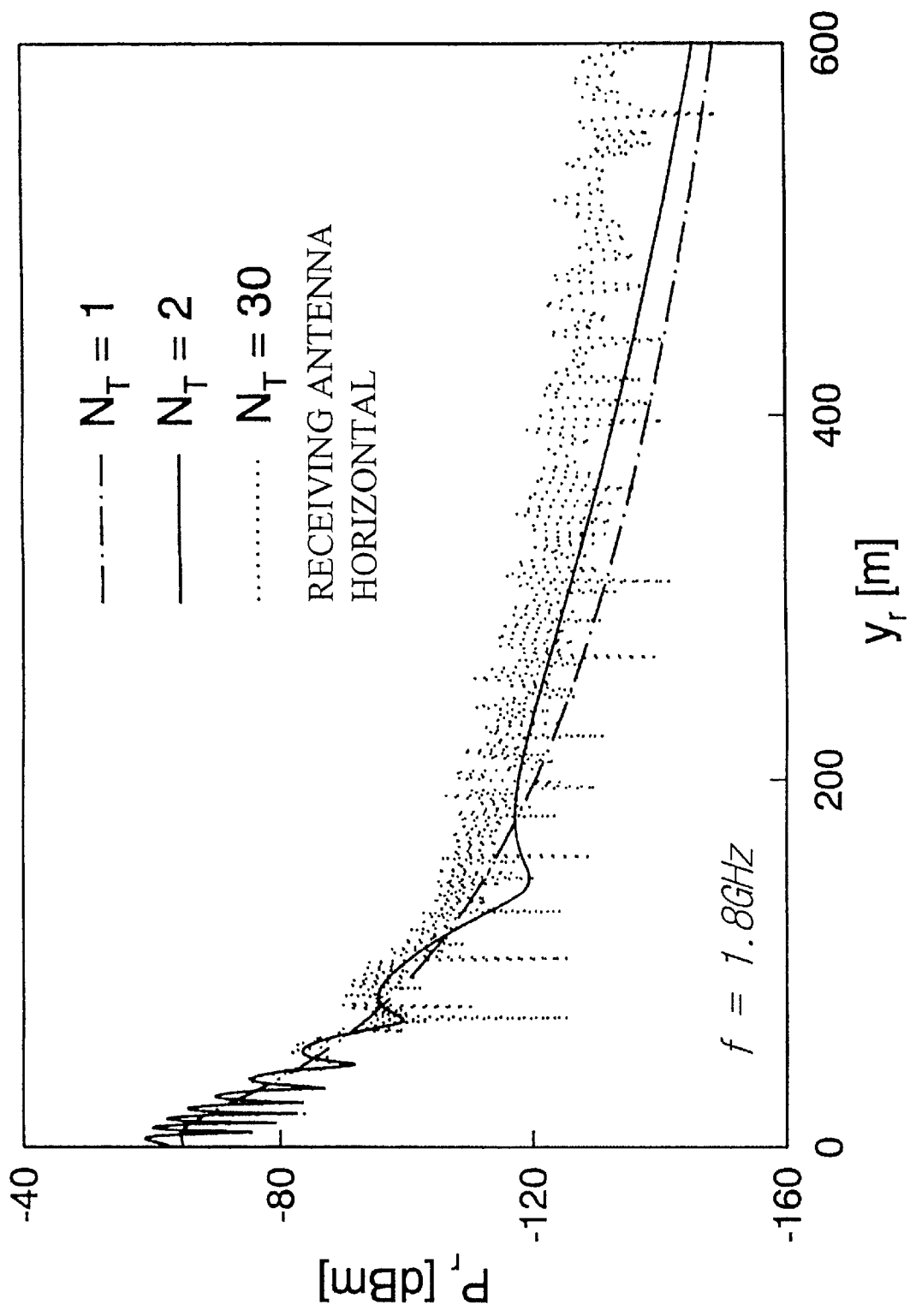
FIG. 7 illustrates an exemplary distribution of receiving power according to the number of the paths, for receiving antennas oriented parallel to the ground surface.

FIGS. 6 and 7 are graphs illustrating results for the receiving power as a function of the number of propagation pathways $N_T$. In this case, the location of the receiving antenna is varied, moving parallel to the y axis from 0m to 600m. The results of FIG. 6 are for a vertically oriented receiving antenna, and those of FIG. 7 are for a horizontally oriented receiving antenna with respect to the ground surface.

In FIG. 6, curves 62, 64 and 66 represent received power as a function of distance $y_r$ (from the transmitting antenna) for the cases of $N_T=30$, 2 and 1, respectively. The case of $N_T=1$ represents the direct wave only, in free space, with no reflections off any obstacles. For the case of $N_T=2$, the receiving antenna receives the direct wave and a wave reflected off the ground. Because of the difference in the distance from the transmitting antenna to the receiving antenna on the ground, and the distance from the transmitting antenna to the image antenna beneath the ground, the direct waves and the ground reflected waves form standing waves. These differences are due to the differences in the z coordinates. Specifically, the more $Y_r$ increases, the longer the period of the receiving power increases. The reason for this is, while the distance in the y direction between the two antennas increase, the z coordinates remain fixed, and therefore the variation of the delay time as a function of the difference in distance between the two antennas becomes relatively small.

When $N_T$ is a larger number, e.g., $N_T=30$ as illustrated by curve 62, the superposition of the multiple reflection waves causes a heavy fading effect. Curve 62 is seen to vary about curve 64, from which it can be inferred that in the canyon model, the long term fading is due to the direct waves and the ground reflection waves, and the short term fading is due to the multiple reflection waves. Therefore, to predict the variation of the receiving power with the canyon model, a plurality of multiple reflection waves are considered.

FIG. 7 shows results for the case where the receiving antenna is parallel to the ground (horizontally polarized). Now, the fact that the waves are received at all means that the transmitting and receiving antennas are not completely cross-polarized. This is because the wave number vector, which is going from the transmitting antenna to the receiving antenna due to the difference in height between the transmitting and receiving antennas, is sloped instead of being parallel to the ground. The receiving power considering these effects can be computed from EQ. 15 which computes the electric field as a vector and considers the polarization direction of the transmitting and receiving antennas.

Figure 8:
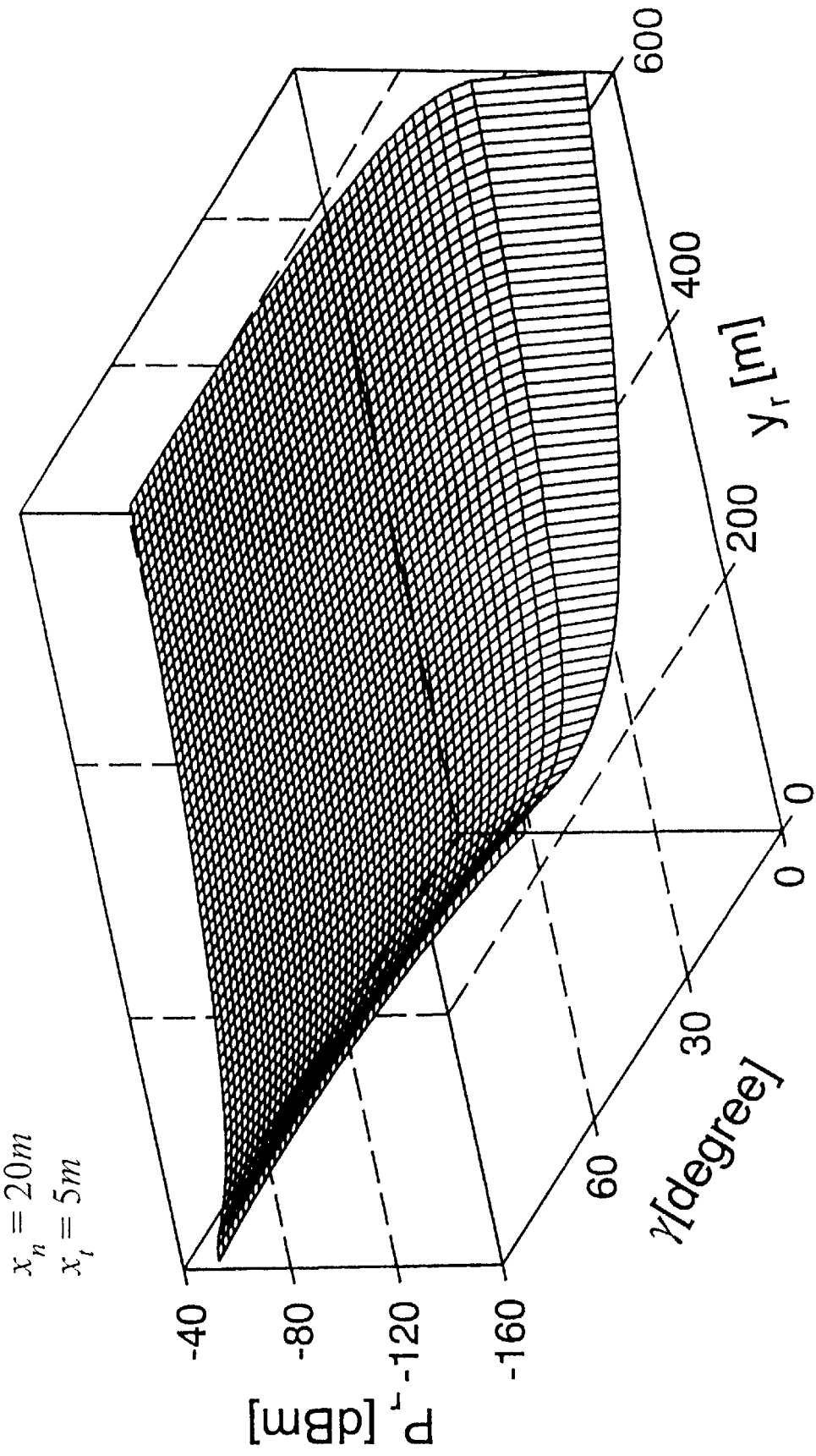
FIGS. 8 and 9 illustrate exemplary distributions of receiving power according to the polarization of the receiving antennas.
Figure 9:
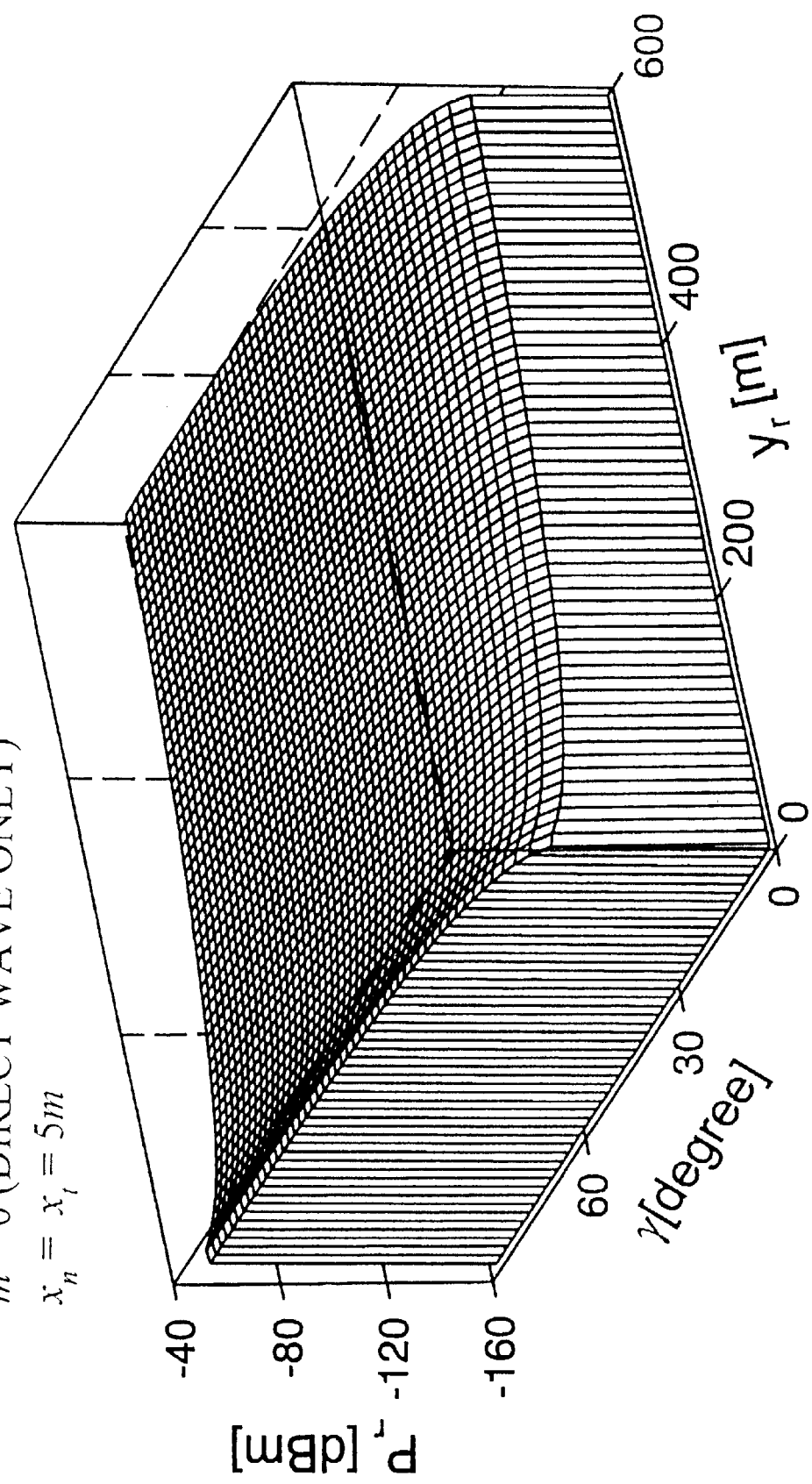

FIGS. 8 and 9 present modeling results for the receiving power according to the location and the polarization direction of the receiving antenna. A mobile station user varies the angle γ, between the receiving antenna 5 in the xz plane (of the rectangular coordinates used in the canyon model) and the x axis, from 0° to 90°, and moves the receiving antenna 5 along the y axis from 0 m to 600 m parallel to the y axis. The distribution of receiving power receiving only the direct waves is shown in the FIGS. 8 and 9. In FIG. 8, the $x_r$ coordinate of the receiving antenna is 20 m, and in FIG. 9, the x coordinates of the receiving antenna 5 and the transmitting antenna 4 are identical, that is, $x_r = x_t$.

In FIG. 8, as for arbitrary $y_r$, the receiving power has the minimum value when γ is 0°, however, the receiving power doesn't always have the maximum value even if y is 90°. This is because, when the receiving electric field from the transmitting antenna 4 to the receiving antenna 5 has the same orientation as the polarization of the receiving antenna 5, the receiving electric field is at a maximum, as can be derived from EQ. 15.

In FIG. 9, if γ is 0° or $y_r$ is 0, the receiving power of only the direct waves is -∞[dBm], that is 0 [watts]. This is because, when γ is 0°, the receiving electric field $E_{rv}$ and the propagation direction $\hat{h}_r$ of the receiving antenna are cross-polarized, so if the product of the above two values are found, it becomes 0, and, when $y_r$ is 0 [m], θ in EQ. 16 becomes 180°, whereby the antenna gain becomes 0.

Thus far, simulation results for the receiving power have been presented as a function of the propagation direction ($y_r$ position). Results for the receiving power as a function of receiving antenna location in the x direction will now be given.

Figure 10:
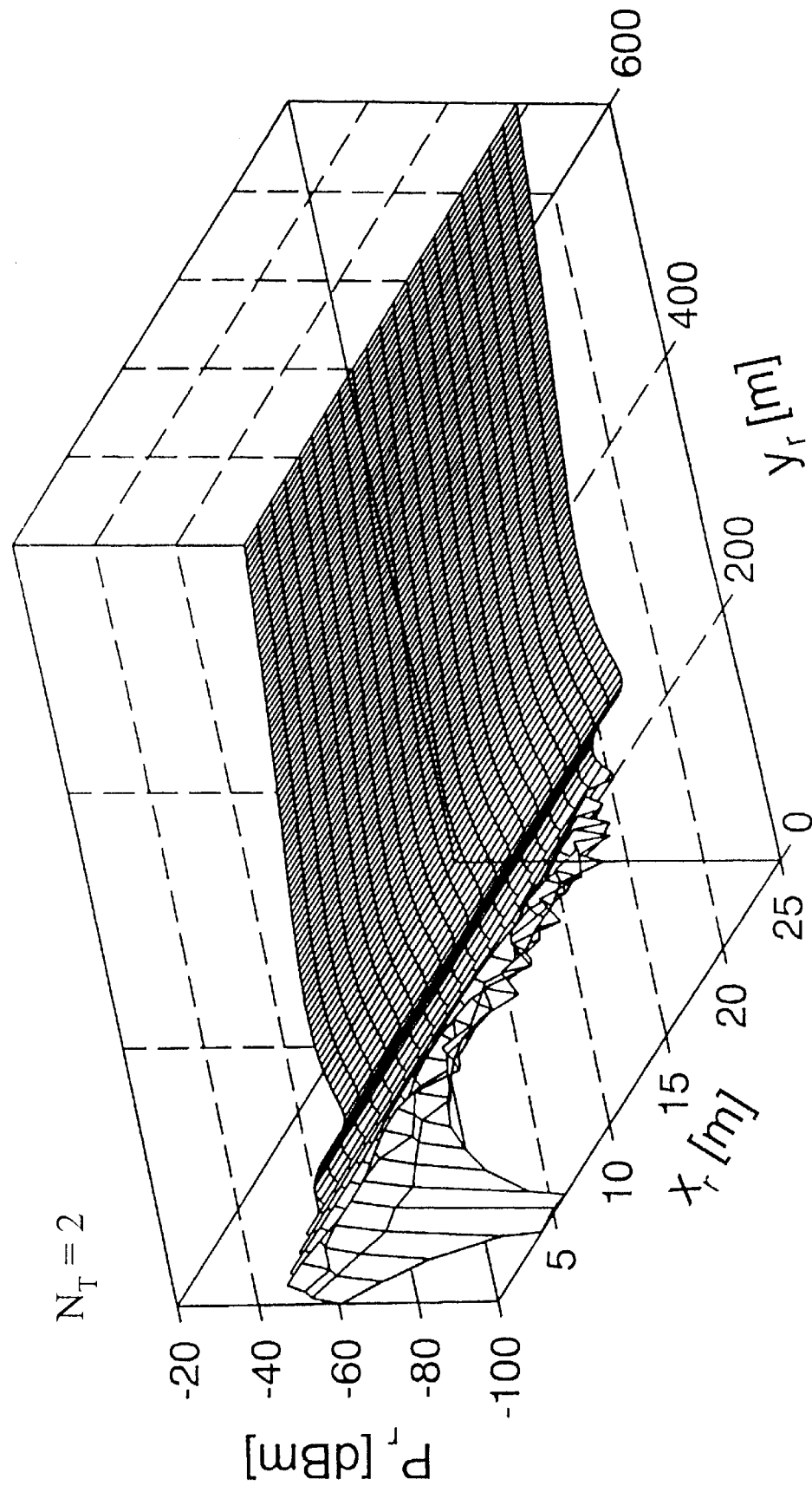
FIGS. 10 and 11 illustrate exemplary distributions of receiving power according to the locations of the receiving antennas.
Figure 11:
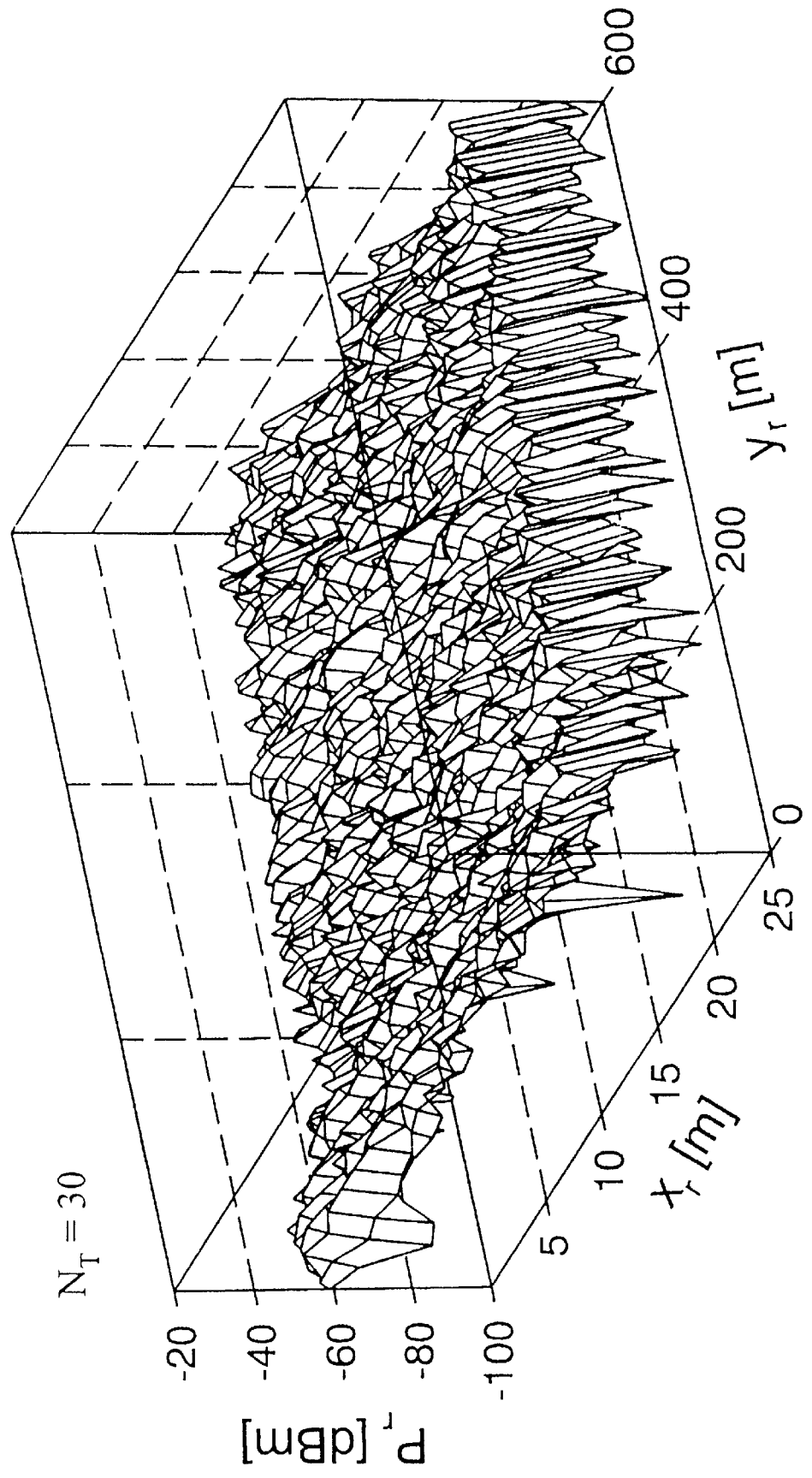

Referring to FIGS. 10 and 11, the three dimensional receiving power distribution is computed by fixing the height of the receiving antenna, and by moving the coordinates ($x_r$, $y_r$) in the x axis direction in increments of 1.25 m and in the y axis direction in 10 m increments. In FIG. 10, the number of pathways $N_T$ is only 2, such that the interference between the direct wave and the ground reflection wave can be observed. In FIG. 11, the number of pathways $N_T$ is 30, whereby the fading effects according to the multiple reflection waves in the canyon model can be observed.

In FIG. 10, as the receiving antenna 5 closely approaches the transmitting point $x_r=5$ m, $y_r=0$ m, there is a sharp reduction in receiving power due to a drop in antenna gain in the near field, as EQ. 16 indicates. Specifically, when the transmitting antenna and the receiving antenna are at the same location, neither the direct waves nor the ground reflection waves are received, as illustrated in FIG. 9.

On the contrary, referring to FIG. 11, though the receiving antenna approaches the transmitting antenna, signals are well received, because the reflection waves reflected on the wall surfaces enhances the receiving power. Also, the fading effect caused by the reception of the multiple reflection waves can be observed.

From the foregoing, it can be appreciated that in accordance with the invention, propagation characteristics for the urban microcell are predicted by employing generalized ray tracing techniques. For this purpose, the city is modeled as a canyon with three surfaces comprised of lossy dielectrics. Image antennas modeling rays reflected off the buildings and the ground are adopted in order to more accurately predict the propagation characteristics between the transmitting and receiving antennas in the canyon model. Moreover, the order of generation of the image antennas is numbered using a square wave numbering technique so as to obtain the coordinates of these image antennas systematically.

The method determines the reflections that the image antennas produce as the radio waves propagate, as well as the coordinates of the reflection points. From this reflection information, a pathway detection technique to compute the electric field as a vector and to consider the respective polarization directions and the directivity of the transmitting antenna and the receiving antenna is developed.

As explained, the present invention extends the number of the pathways by using generalized image techniques in the urban model, and considers the location and the polarization direction of the transmitting and receiving antennas. Thus, the receiving power, which is the parameter of paramount importance in digital communication, is computed by taking into account the effect of polarization.

Through the simulation results, more accurate fading effects can be obtained because of the increase of the number of the pathways, and the distribution of the receiving power can be obtained, including the effect of varying the polarization of the receiving antenna. Therefore, the present invention contemplates that the number of the indefinite propagation pathways existing in the canyon model can not be optionally restricted and the polarization caused by the multiple reflection can not be neglected.

While the invention has been described in reference to specific embodiments thereof, it will be apparent to one skilled in the art that many modifications can be made to the disclosed embodiments without departing from the scope and spirit of the invention as defined by the appended claims.

What is claimed is:

1. A computer-implemented method for predicting the characteristics of wave propagation in an urban environment, comprising the steps of:

defining an urban canyon having boundaries comprising a pair of building surfaces and a ground surface, and having transmitting and receiving antennas therein;

establishing a plurality of first reflection points on said ground and building surfaces at which direct rays from a transmitting antenna are reflected;

defining a plurality of image antennas, each corresponding to a reflection off a building or ground surface in said urban canyon;

determining propagation paths corresponding to said image antennas, wherein the propagation paths are determined by finding a reflection order of the propagation paths using a total reflection count according to the number and the propagation paths of said image antennas and counts of the propagation of waves reflected off the building surfaces prior to the propagation of waves reflected off the ground surface;

computing respective reflection electric field vectors of said propagation paths corresponding to the image antennas; and determining the total receiving power of a receiving antenna through said computed reflection electric field vectors of the propagation paths and a unit polarization vector of the receiving antenna.

2. A method for predicting the characteristics of wave propagation in an urban environment, comprising the steps of:

numbering a plurality of image antennas corresponding to reflections between transmitting and receiving antennas in an urban canyon model of the urban environment;

determining propagation paths corresponding to said respective numbered image antennas, wherein the propagation paths are determined by finding a reflection order of the propagation paths using a total reflection count according to the number and the propagation paths of said image antennas and counts of the propagation of waves reflected off building surfaces prior to the propagation of waves reflected off a ground surface;

determining the respective first reflection points of said propagation paths corresponding to the image antennas;

computing respective reflection electric field vectors of said propagation paths corresponding to the image antennas; and determining the total receiving power of a receiving antenna through said computed reflection electric field vector of the propagation paths and a unit polarization vector of the receiving antenna.

3. A computer-implemented method for predicting the characteristics of wave propagation, comprising the steps of:

defining an urban canyon having boundaries comprising a pair of building surfaces and a ground surface, and having transmitting and receiving antennas therein;

computing a number $k_{nv}$ of reflections off the building surfaces for a single propagation pathway, said reflections of said propagation pathway occurring prior to any reflections off the ground surface, where $k_{nv}$ is computed using:

$$k_{nv} = (-1)^n i - \frac{1+(-1)^n}{2}$$

where, n is the number of the image antenna according to the reflections off the building surfaces, I is a value satisfying a condition of 'z' being a maximum among the values satisfying z<0, 'z' being found by $$z = z_t = \frac{z_v - z_t}{x_n - x_t}(iw - x_t),$$

w is the road width of the canyon, $(x_t, y_t, z_t)$ are the coordinates of the transmitting antenna, $(x_n, y_n, z_v)$ are the coordinates of the image antennas of the n-times reflections off the building surfaces and the v-times reflections off the ground surfaces; and, computing characteristics of wave propagation using the value determined for $k_{nv}$.

4. A computer-implemented method for predicting the characteristics of wave propagation, comprising the steps of:

defining an urban canyon having boundaries comprising a pair of building surfaces and a ground surface, and having transmitting and receiving antennas therein;

computing coordinates of a first reflection point $(x_p, y_p, z_p)$ at which a radio wave transmitted from said transmitting antenna first reflects off one of said building surfaces in accordance with the following expressions:

$$x_p = \frac{1+(-1)^n}{2}w$$

$$y_p = y_t + \frac{y_n - y_t}{x_n - x_t}(x_p - x_t)$$

$$z_p = z_t + \frac{z_v - z_t}{x_n - x_t}(x_p - x_t).$$

where, n is the number of an image antenna corresponding to a reflection off a building surface in the canyon, w is the road width of the canyon, $(x_t, y_t, p_t)$ are the coordinates of the transmitting antenna, $(x_n, y_n, z_v)$ are the coordinates of the image antenna; and computing characteristics of a reflection wave that reflects off the one building surface at the first reflection point.

5. A computer-implemented method for predicting the characteristics of wave propagation, comprising the steps of:

defining an urban canyon having boundaries comprising a pair of building surfaces and a ground surface, and having transmitting and receiving antennas therein;

computing coordinates of a first reflection point $(x_p, y_p, z_p)$ at which a radio wave transmitted from said transmitting antenna reflects off the ground surface in accordance with the following expressions:

$$x_p = x_t + \frac{x_n - x_t}{z_v - z_t}(z_p - z_t),$$

$$y_p = y_t + \frac{y_n - y_t}{z_v - z_t}(z_p - z_t),$$

$$z_p = 0.$$

where $(x_t, y_t, z_t)$ are the coordinates of the transmitting antenna, and $(x_n, y_n, z_v)$ are the coordinates of an image antenna corresponding to a reflection off a surface in the canyon; and computing characteristics of a reflection wave that reflects off the ground surface at the first reflection point.

6. A computer-implemented method for predicting the characteristics of wave propagation, comprising the steps of:

defining an urban canyon having boundaries comprising a pair of building surfaces and a ground surface, and having transmitting and receiving antennas therein;

computing a reflection electric field $E_r$ of an incident electric field at each reflection point of a reflective surface in the canyon in accordance with the following equation:

$$\underline{E}_r = \underline{E}_i \cdot \bar{\bar{\Gamma}} \frac{\rho}{\rho + s} e^{-jks},$$

where, $E_i$ is the incident electric field, $\rho$ is the radius of curvature of a reflection wave front at the reflection point, s is the distance from the reflection point to a field point, k is the wave number, and $\Gamma$ is a dyadic reflection coefficient.

7. The method as set forth in claim 6, wherein $\bar{\bar{\Gamma}}$+ee is computed by:

$$\bar{\bar{\Gamma}} = \hat{e}'_\perp \hat{e}_\perp \Gamma_\perp + \hat{e}'_\perp \hat{e}_\parallel \Gamma_\parallel$$

where $\hat{e}'_\perp$ is the unit vector of a perpendicular polarization component of an incident wave before the reflection;

$\hat{e}_\perp$ is the unit vector of a perpendicular polarization component of the reflection wave after the reflection, $\hat{e}'_\parallel$ is the unit vector of a parallel polarization component of the incident wave;

$\hat{e}_\parallel$ is the unit vector of a parallel polarization component of the reflection wave;

$\Gamma_\perp$ is the reflection coefficient of the reflective surface for perpendicular polarization; and $\Gamma_\parallel$ is the reflection coefficient of the reflective surface for parallel polarization.

8. The method as set forth in claim 7, wherein $\Gamma_\perp$ and $\Gamma_\parallel$ are computed by:

$$\Gamma_\perp = \frac{\cos\alpha - \sqrt{\varepsilon_r - \sin^2\alpha}}{\cos\alpha + \sqrt{\varepsilon_r - \sin^2\alpha}},$$

$$\Gamma_\parallel = \frac{\varepsilon_r\cos\alpha - \sqrt{\varepsilon_r - \sin^2\alpha}}{\varepsilon_r\cos\alpha + \sqrt{\varepsilon_r - \sin^2\alpha}},$$

where, $\mu_0$ is the permeability of free space;

$\alpha$ is the angle of incidence of the radio wave; and $\varepsilon_r$ is the permittivity of the reflective surface.

9. The method as set forth in claim 8, wherein $\alpha$ is computed by:

$$\alpha = \cos^{-1}(-\hat{n}\cdot\hat{s}),$$

where, $\hat{n}$ is the normal vector of the reflective surface; and $\hat{s}'$ is the unit vector of the incident wave.

10. The method as set forth in claim 8, wherein $\varepsilon_r$ is computed by:

$$\varepsilon_r = \varepsilon'_r - j\frac{\sigma}{\bar{\omega}\varepsilon_0},$$

where, $\varepsilon'_r$ is relative permittivity;

$\sigma$ is conductivity;

$\bar{\omega}$ is angular frequency; and $\varepsilon_0$ is the permittivity of free space.

11. A computer-implemented method for predicting the characteristics of wave propagation, comprising the steps of:

defining an urban canyon having boundaries comprising a pair of building surfaces and a ground surface, and having transmitting and receiving antennas therein; and computing receiving power $P_r$, arriving from the transmitting to receiving antenna, in accordance with the following equation:

$$P_r = \frac{\lambda^2}{4\pi\eta}\left(\sum_{v=0}^{1}\sum_{n=0}^{N}\sqrt{G_{nv}}\,E_{nv}\cdot\hat{h}_r\right)^2,$$

where, considering the directivity and the polarization of the transmitting antenna and the receiving antenna in the urban canyon model, $\lambda$ is the wavelength of a radio wave transmitted from the transmitting antenna;

$\eta$ is free space wave impedance;

n is a number defining a specific image antenna corresponding to a reflection between the pair surfaces in the canyon;

v is a number defining whether an image antenna under consideration is above or below ground surface;

N is a number of image antennas corresponding to a total number of reflections off the building surfaces;

$G_{nv}$ is the gain of the receiving antenna in the direction of wave propagation corresponding to the $nv^{th}$ image antenna;

$E_{nv}$ is the electric field vector reaching the receiving antenna through the wave propagation path corresponding to the $nv^{th}$ image antenna; and $\hat{h}_r$ is the unit polarization vector of the receiving antenna.

12. The method as set forth in claim 11, wherein the number of the total wave propagation paths $N_T$ from the transmitting antenna to the receiving antenna is, $$N_T = 2(N+1).$$

* * * * *